United States Patent [19]
Silder, Jr. et al.

[11] Patent Number: 6,052,069
[45] Date of Patent: Apr. 18, 2000

[54] TAXI AND SLOPE LANDING SYMBOLOGY FOR A HELICOPTER

[75] Inventors: Stephen H. Silder, Jr., Monroe; Howard P. Harper, Shelton; John J. Occhiato, Derby, all of Conn.

[73] Assignee: Sikorsky Aircraft Corporation, Stratford, Conn.

[21] Appl. No.: 08/959,834

[22] Filed: Oct. 29, 1997

[51] Int. Cl.[7] ................................................. G08B 21/00
[52] U.S. Cl. .................... 340/946; 244/17.11; 340/963; 701/14
[58] Field of Search .................... 340/946, 963, 340/945, 960, 971, 980; 244/1 R, 17–11; 73/178 H; 701/14, 9, 8, 15, 16

[56] References Cited

U.S. PATENT DOCUMENTS 4,115,755  9/1978  Cotton .
4,573,351  3/1986  Wiener ................................ 73/178 H
5,150,117  9/1992  Hamilton et al. ....................... 340/946
5,808,563  9/1998  Ching et al. ............................ 340/971

*Primary Examiner*—Brent A. Swarthout
*Attorney, Agent, or Firm*—Seidel, Gonda, Lavorgna & Monaco, PC

[57] ABSTRACT

Taxi and slope landing symbology for a helicopter having a main rotor drive shaft and a main rotor hub defining a hub moment, wherein the main rotor drive shaft and the main rotor hub have hub moment limits. The taxi and slope landing symbology comprises a first symbol for providing a symbolic representation of the hub moment limits, and a second symbol for providing a dynamic symbolic representation of the hub moment, wherein the second symbol is disposed in combination with the first symbol to provide a visual cue of the hub moment relative to the hub moment limits.

17 Claims, 4 Drawing Sheets

6,052,069

1

TAXI AND SLOPE LANDING SYMBOLOGY FOR A HELICOPTER

TECHNICAL FIELD

This invention relates generally to helicopter status displays, and more particularly, to taxi and slope landing symbology for providing a visual cue of hub moments for a main rotor drive shaft and main rotor hub relative to predetermined hub moment limits.

BACKGROUND OF THE INVENTION

Landing a helicopter on a sloped landing surface is a challenging task that requires a pilot to first make contact between one of the helicopter's skids or wheels and an upper portion of the sloped landing surface, displace the cyclic toward the slope to maintain the contact between the skid or wheel and the sloped landing surface, and lower the collective to bring the other skid or wheel(s) into contact with a lower portion of the sloped landing surface. During this landing procedure, a pilot must divide his/her attention between outside visual references and information displayed on the helicopter's internal instrumentation.

Specifically, the pilot refers to outside visual references to gauge distances between the landing skids or wheels and the sloped landing surface, while also ensuring that the landing surface and the surrounding areas are free from obstacles that would complicate a sloped landing. In addition, the pilot also refers to the outside surroundings to ensure that the main rotor blades and tail rotor blades are free from obstacles as well.

As the pilot displaces the cyclic toward the sloped landing surface to maintain contact between the skid or wheel and the surface, the helicopter fuselage is called upon to pitch and/or roll in a direction of great resistance (i.e., the sloped landing surface). Therefore, since the main rotor blades are engaged in a pitch and/or roll configuration toward the sloped landing surface, and since the helicopter fuselage is prevented from pitching and/or rolling in that direction because of contact with the sloped landing surface, a "hub moment" is created at the hub of the main rotor drive shaft. In other words, the hub experiences forces at an angle relative to the main rotor drive shaft's axis of rotation, thereby creating a moment. Since the helicopter's fuselage is not free to pitch and/or roll in that direction, the main rotor drive shaft and hub experience stresses and strains created by the hub moment. Prolonged or frequent exposure of the main rotor drive shaft and hub to these stresses and strains can result in damage to the main rotor drive shaft and hub.

To assist the pilot in determining whether or not the slope landing he/she is undertaking is generating undesirable hub moments, the pilot is provided with pitch and roll limits for that helicopter in slope landing situations. These pitch and roll limits are in the form of angle limitations that the pilot can compare to the pitch and roll angles presented by the helicopter's attitude indicator. Therefore, during a slope landing, the pilot has to frequently observe the attitude indicator to ensure that the pitch and roll angles of the helicopter during the landing are within the pitch and roll limits. This observation of the attitude indicator has to be carried-out concurrently with the pilot's observation of the outside visual references. Thus, the pilot must divide his or her attention between the outside visual references and the information displayed on the helicopter's internal instrumentation, to properly carry-out a slope landing.

The creation of hub moments is not limited to landing situations. During taxi and takeoff of a helicopter, a pilot may be required to displace the cyclic forward to generate forward movement of the helicopter on the ground. However, since the wheels or skids of the helicopter are still in contact with the takeoff surface, a hub moment is created as the fuselage resists the pitching force generated by the blades that would ordinarily result in the nose of the helicopter pitching downward during flight. Therefore, in order to avoid creating excessive stresses and strains on the main rotor drive shaft and hub during taxi and takeoff, the pilot must also divide his or her attention between the outside visual references and the helicopter's internal instrumentation.

DISCLOSURE OF THE INVENTION

It is therefore an object of the present invention to provide a means for a helicopter pilot to readily ascertain the hub moment of the helicopter, while not significantly diverting the pilot's attention from outside visual references.

Another object of the present invention is to provide a means for a helicopter pilot to readily ascertain the hub moment of the helicopter, relative to hub moment limits, while not significantly diverting the pilot's attention from outside visual references.

Yet another object of the present invention is to provide a means for a helicopter pilot to readily ascertain the hub moment of the helicopter, and contact status between the helicopter's landing gear or skids and a landing surface, while not significantly diverting the pilot's attention from outside visual references.

These objects are achieved in the present invention by taxi and slope landing symbology for a helicopter having a main rotor drive shaft and a main rotor hub defining a hub moment, wherein the main rotor drive shaft and the main rotor hub have hub moment limits. The taxi and slope landing symbology comprises a first symbol for providing a symbolic representation of the hub moment limits, and a second symbol for providing a dynamic symbolic representation of the instantaneous hub moment, wherein the second symbol is disposed in combination with the first symbol to provide a visual cue of the instantaneous hub moment relative to the hub moment limits.

Still other objects and advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BEST MODE FOR CARRYING OUT THE INVENTION

Figure 1:
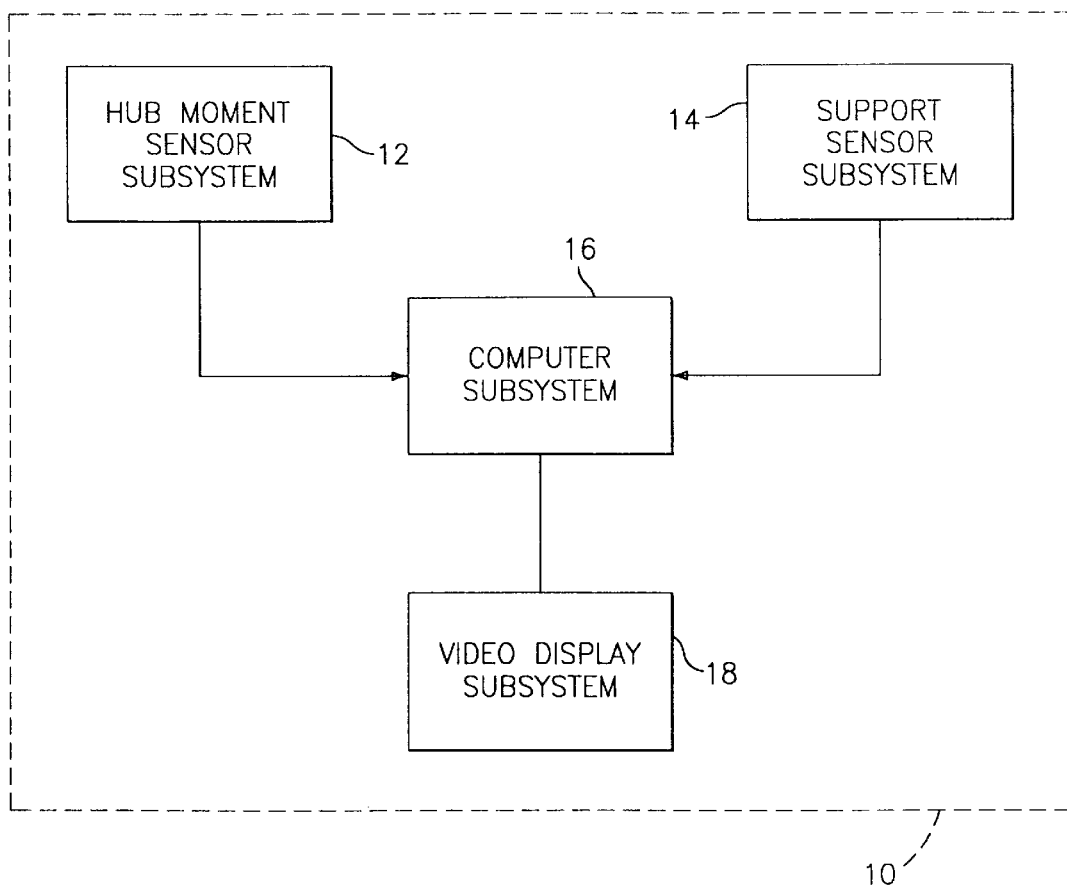
FIG. 1 is a schematic illustration of a taxi and slope landing symbology display system for a helicopter, embodying features of the present invention.

Referring now to the drawings wherein like reference characters identify corresponding or similar elements throughout the several views, FIG. 1 is a schematic illustration of a taxi and slope landing symbology display system 10 for a helicopter embodying features of the present invention. As will be discussed in greater detail below, the taxi and slope landing symbology display system 10 comprises a hub moment sensor subsystem 12, a landing sensor subsystem 14, a computer subsystem 16, and a video display subsystem 18.

Figure 2:
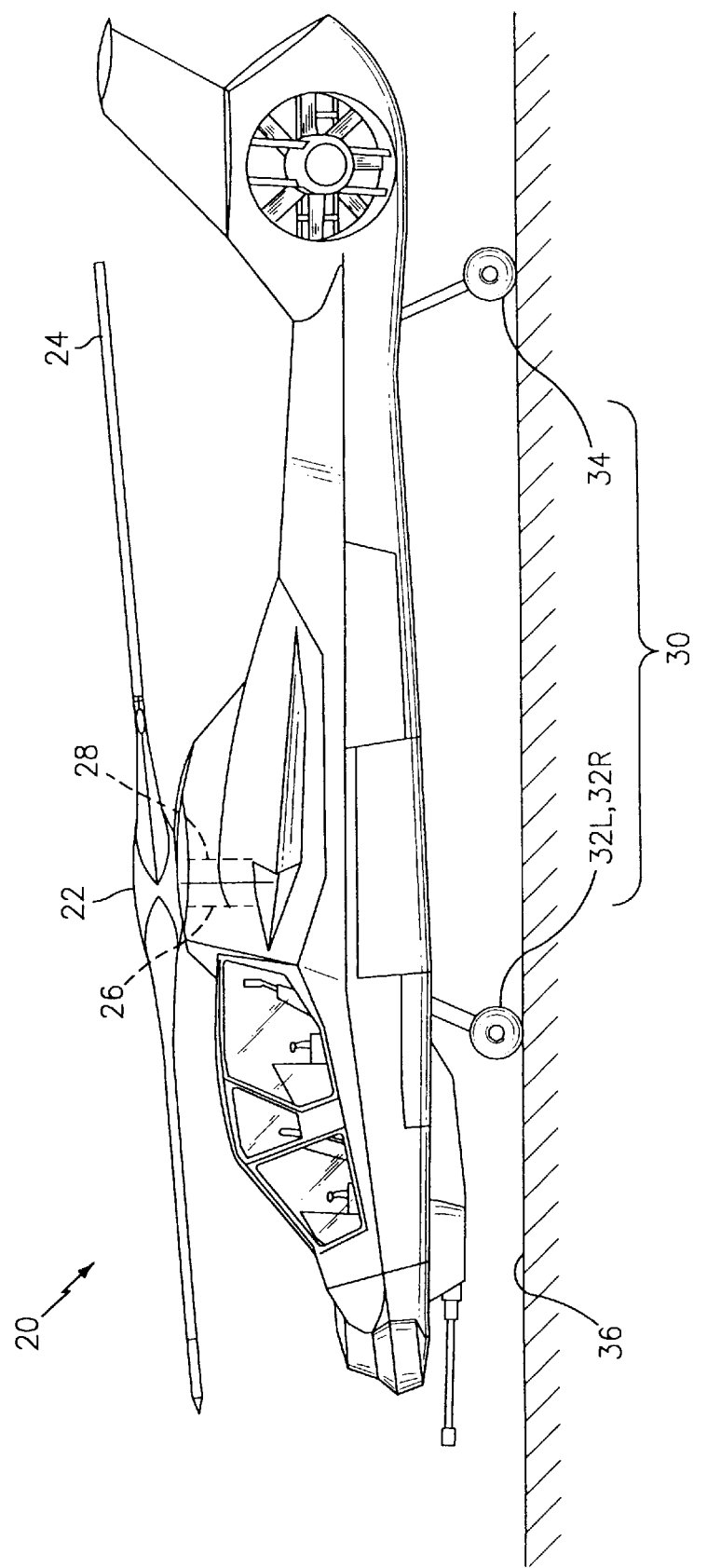
FIG. 2 is a side view of a COMANCHE helicopter capable of embodying the taxi and slope landing symbology display system of FIG. 1.

A Boeing-Sikorsky RAH-66 COMANCHE helicopter 20 capable of embodying the taxi and slope landing symbology display system 10 is depicted in FIG. 2. The COMANCHE helicopter 20 includes a main rotor hub 22 with a plurality of main rotor blades 24 attached thereto, and a main rotor drive shaft 26 connected to the main rotor hub 22 for driving the main rotor hub 22 and the main rotor blades 24 into rotational movement about a main rotor drive shaft axis 28. It will be appreciated that in alternative embodiments, the taxi and slope landing symbology display system 10 can be embodied in helicopters other than the COMANCHE helicopter 20.

In the described embodiment, as illustrated in FIGS. 1 and 2, the hub moment sensor subsystem 12 comprises a plurality of strain gauges (not shown) disposed in combination with the main rotor drive shaft 26 in a conventional manner for detecting strain in a shaft, wherein the strain gauges are operable to detect strain in the main rotor drive shaft 26 generated by hub moments. The hub moment sensor subsystem 12 is electronically connected to the computer subsystem 16, thereby being operable to deliver data to the computer subsystem 16 indicative of such hub moments. In alternative embodiments, the hub moment sensor subsystem 12 can comprise other means known in the art for detecting stress, strain, or moments in the main rotor drive shaft 26 or the main rotor hub 22, and transmitting such data to the computer subsystem 16.

The computer subsystem 16 is of a conventional type for receiving input data from multiple sensors, processing the input data in accordance with the computer subsystem's programming, and delivering output data to an output device. In the described embodiment, the computer subsystem 16 includes a conventional symbol generator (not shown) for formatting the output data into a symbolic format for use in combination with the video display subsystem 18.

In the described embodiment, the computer subsystem 16 is programmed with hub moment limit data representative of hub moment limits for the main rotor drive shaft 26 and main rotor hub 22. It will be appreciated that the hub moment limit data is helicopter-dependent, and is indicative of the maximum hub moments and associated stresses and strains that the main rotor drive shaft 26 and main rotor hub 22 should be exposed to during operation of the helicopter.

The COMANCHE helicopter 20 further includes a landing assembly 30, which in the described embodiment comprises a set of landing gear having a left forward wheel 32L, a right forward wheel 32R (obstructed in FIG. 2), and a tail wheel 34, wherein the landing gear 30 supports the COMANCHE helicopter 20 relative to a surface 36. The landing sensor subsystem 14 is disposed in combination with the landing gear 30 and the computer subsystem 16 in a conventional manner for sensing contact status between the landing gear 30 and the surface 36 (also known as "weight on wheels"), and for delivering such contact status data to the computer subsystem 16. In alternative embodiments, the landing assembly 29 can comprise any combination of skids, pontoons, wheels, or other means known in the art for supporting a helicopter relative to a surface.

In the described embodiment, the video display subsystem 18 is connected to the computer subsystem 16, and comprises a conventional helmet-mounted display (not shown) for displaying graphical and symbolic images in combination with a pilot's (not shown) normal field of vision. A helmet-mounted display for use in combination with the COMANCHE helicopter 20 is disclosed in further detail in U.S. Pat. No. 5,150,117, granted to Hamilton et al, and assigned to the United Technologies Corporation. In alternative embodiments, the video display subsystem 18 can comprise a conventional heads-up display, display monitor, or any other means known in the art for displaying symbolic images.

Figure 3:
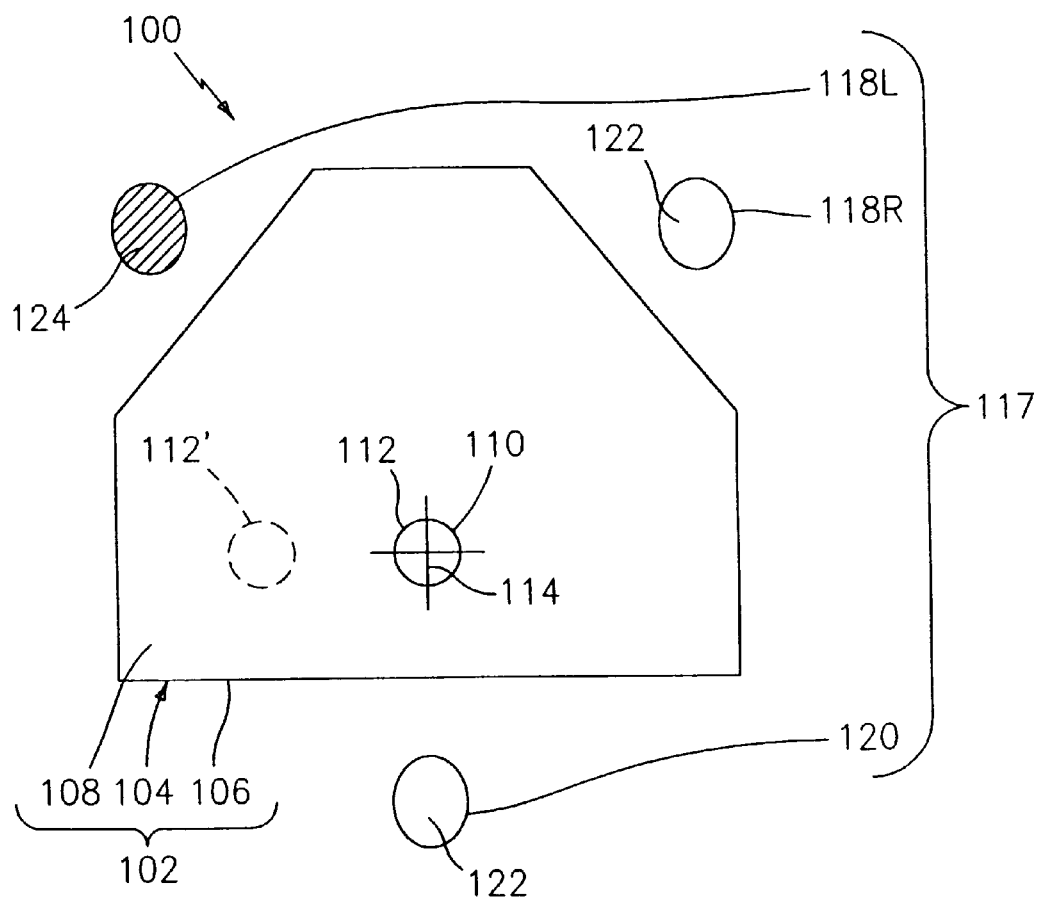
FIG. 3 is a plan view of taxi and slope landing symbology embodying features of the present invention.

Taxi and slope landing symbology 100 provided by the taxi and slope landing symbology display system 10 is illustrated in FIG. 3. The taxi and slope landing symbology 100 is a continuously updated combination of symbols that provide the pilot with visual cues regarding the magnitude and direction of hub moments, and the contact status of the landing gear 30.

Referring to FIGS. 1–3, the taxi and slope landing symbology 100 includes a first symbol 102 for providing a symbolic representation of the hub moment limits. In the described embodiment, the first symbol 102 comprises a polygon 104 having a plurality of sides 106 defining an interior region 108. For the described embodiment, the left sides $106_{left}$ of the polygon 104 provide visual cues of the hub moment limits in the direction of the left side of the COMANCHE helicopter 20, the right sides $106_{right}$ of the polygon 104 provide visual cues of the hub moment limits in the direction of the right side of the COMANCHE helicopter 20, the top side $106_{top}$ of the polygon 104 provides visual cues of the hub moment limits in the direction of the forward portion of the COMANCHE helicopter 20, and the bottom side of the polygon $106_{bottom}$ of the polygon 104 provides visual cues of the hub moment limits in the direction of the tail portion of the COMANCHE helicopter 20. It will be appreciated that the selection of a polygon shape, and the configuration of the polygon 104 are dictated by the hub moment limits for the COMANCHE helicopter 20, and therefore, in alternative embodiments, the first symbol 102 can comprise a symbol or multiple symbols of any shape or configuration that provide a visual cue of the hub moment limits for the particular helicopter.

A second symbol 110 provides a dynamic symbolic representation of the instantaneous hub moment, and is disposed in combination with the first symbol 102 to provide a visual cue of the instantaneous hub moment relative to the hub moment limits. In the described embodiment, the second symbol 110 comprises a closed curvilinear geometric figure 112 disposed within the interior region 108 of the polygon 104, and capable of movement relative to the sides 106 of the polygon 104 in response to changes in the instantaneous hub moment. In alternative embodiments, the second symbol 110 can comprise any shape or configuration that, in combination with the hub moment limit symbols and/or configuration, provides a visual cue of the instantaneous hub moment relative to the hub moment limits.

A third symbol 114 provides a symbolic representation of zero hub moment, and is disposed in combination with the first symbol 102 and the second symbol 110 to provide a visual cue of the instantaneous hub moment relative to the hub moment limits and the zero hub moment. In the described embodiment, the third symbol 114 comprises cross hairs disposed within the interior region 108 of the polygon 104, and positioned in a static relationship relative to the first symbol 102. In alternative embodiments, the third symbol 114 can comprise any shape or configuration that, in combination with the instantaneous hub moment symbols and/or configuration, and the hub moment limit symbols and/or configuration, provides a visual cue of the instantaneous hub moment relative to the hub moment limits and the zero hub moment.

Figure 4:
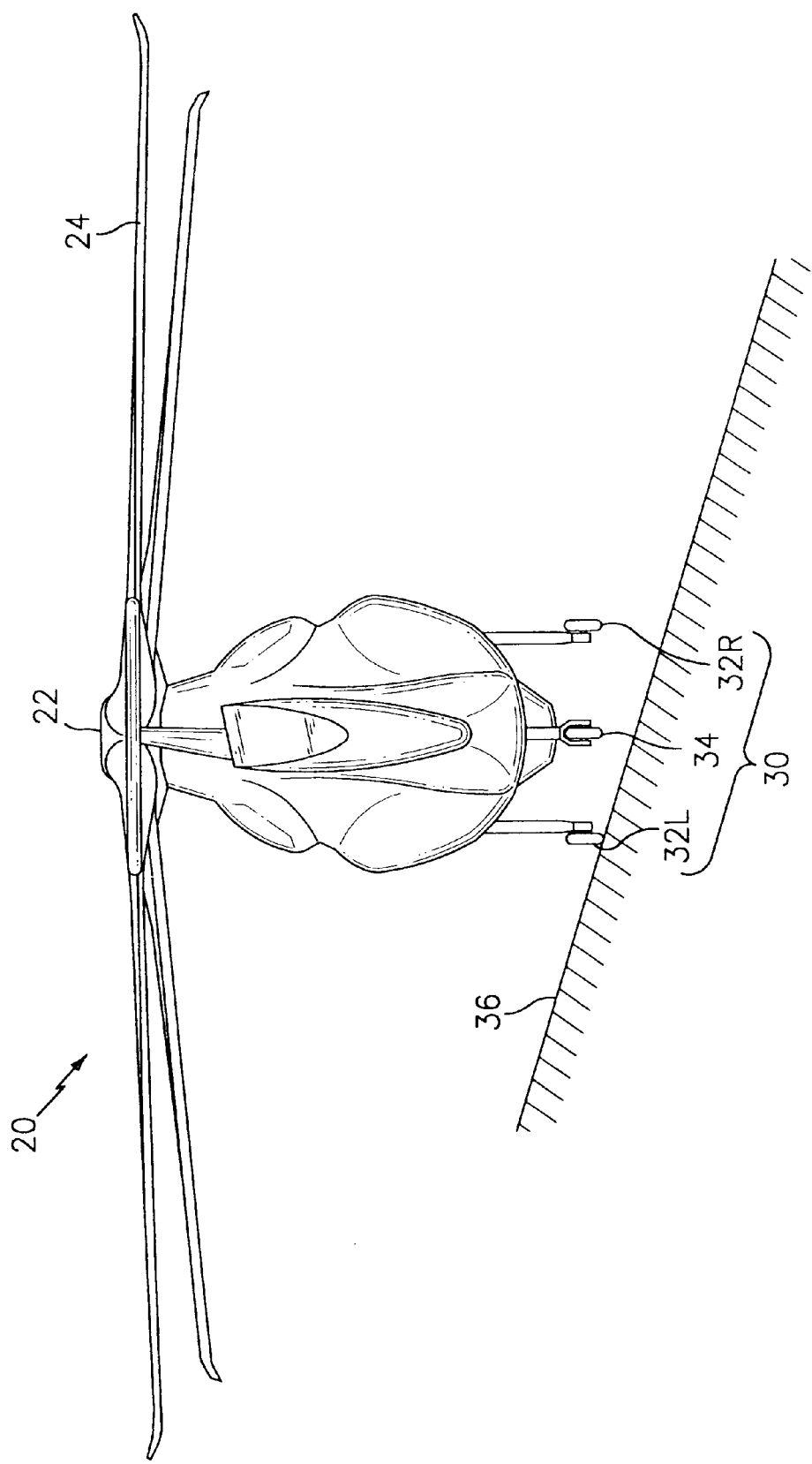
FIG. 4 is a rear view of the COMANCHE helicopter of FIG. 2, engaged in a slope landing.

A fourth symbol 117 is disposed in combination with the first symbol 102, and provides a symbolic representation of the contact status between the landing gear 30 and the surface 36. In the described embodiment, the fourth symbol 117 comprises a plurality of closed curvilinear geometric figures 118L, 118R, 120, wherein two of the closed curvilinear geometric figures 118L, 118R are disposed in combination with the first symbol 102 to provide a visual cue of the forward wheels 32L, 32R, respectively, and wherein one of the closed curvilinear geometric figure 120 is disposed in combination with the first symbol 102 to provide a visual cue of the tail wheel 34. As illustrated in FIGS. 3 and 4, the closed curvilinear geometric figures 118L, 118R, 120 have a first configuration 122 representative of the corresponding wheels 32R, 34 not contacting the surface 36, and a second configuration 124 representative of the corresponding wheel 32L contacting the surface 36. In the described embodiment, the first configuration 122 comprises an unfilled closed curvilinear geometric figure, and the second configuration 124 comprises a filled closed curvilinear geometric figure. Accordingly, the first configuration 122 and the second configuration 124 provide, respectively, visual cues as to which of the plurality of wheels 32L, 32R, 34 are not in contact with the surface 36, and which of the plurality of wheels 32L, 32R, 34 are in contact with the surface 36.

In alternative embodiments, the fourth symbol 117 can comprise any shape, configuration, or plurality of shapes and configurations that provide a visual cue as to the contact status between the landing assembly 29 and the surface 36.

Referring to FIGS. 1–4, the operation of the taxi and slope landing symbology display system 10 will now be described in greater detail for the COMANCHE helicopter 20 during an exemplary landing wherein the surface 36 is sloped in a downward direction from the left side of the COMANCHE helicopter 20 to the right side of the COMANCHE helicopter 20.

Prior to contact between the landing gear 30 and the surface 36, the main rotor drive shaft 26 and the main rotor hub 22 experience minimal hub moments since the COMANCHE helicopter 20 is free to maneuver in response to cyclic (not shown) input. Therefore, as illustrated in FIG. 3, the closed curvilinear geometric figure 112 is initially disposed within the interior region 108 of the polygon 104 at a location proximal to the cross hairs 114, thereby providing a visual cue indicating that the instantaneous hub moment is approximately zero.

As will be appreciated from the illustration in FIG. 4, since the surface 36 slopes downward from left to right, the forward wheel 32L makes initial contact with the surface 36 during the process of landing. Upon contact between the forward wheel 32L and the surface 36, the landing sensor subsystem 14 generates data indicative of the contact status between the forward wheel 32L and the surface 36, and delivers such contact status data to the computer subsystem 16. In response to the input of data indicative of the contact between the forward wheel 32L and the surface 36, the computer subsystem 16 initiates the generation of the taxi and slope landing symbology 100 and initiates transmission of the taxi and slope landing symbology 100 to the video display subsystem 18. Since the computer subsystem 16 is receiving data indicative of contact between the forward wheel 32L and the surface 36, the computer subsystem 16 ensures that the closed curvilinear geometric figure 118L is generated in the second configuration 124. In addition, since the landing sensor subsystem 14 is generating data indicative of no contact between the forward wheel 32R and the surface 36, and the tail wheel 34 and the surface 36, the computer subsystem 16 ensures that the closed curvilinear geometric figure 118R and the closed curvilinear geometric figure 120 are both generated in the first configuration 122.

To proceed with the slope landing following contact between the forward wheel 32L and the surface 36, the pilot displaces the cyclic toward the surface 36 to maintain contact therebetween, and concurrently lowers the collective (not shown) to bring the other forward wheel 32R and the tail wheel 34 into eventual contact with the surface 36. As the cyclic is displaced toward the surface 36, a hub moment is created in the main rotor drive shaft 26 and the main rotor hub 22 as the COMANCHE helicopter 20 is constrained from rolling left by the surface 36. Following the creation of the hub moment, the hub moment sensor subsystem 12 generates data representative of the instantaneous hub moment and transmits that hub moment data to the computer subsystem 16. The computer subsystem 16, in turn, generates the closed curvilinear geometric figure 112 and dynamically adjusts the position of the closed curvilinear geometric figure 112 relative to the plurality of sides 106 of the polygon 104 in response to the hub moment data.

The position of the closed curvilinear geometric figure 112 relative to the plurality of sides 106 of the polygon 104 and the cross hairs 114 provides visual cues of the direction and magnitude of the instantaneous hub moment. Specifically, the direction of the instantaneous hub moment can be visually ascertained through the spatial position and movement of the closed curvilinear geometric figure 112 relative to the sides 106 of the polygon 104. Therefore, in the slope landing example of FIG. 4, wherein the cyclic is displaced left toward the surface 36 thereby increasing the instantaneous hub moment in that direction, the closed curvilinear geometric figure 112 translates accordingly from the cross hairs 114 to a new position 112' closer to the left sides $106_{left}$ of the polygon 104.

In addition, the proximity of the closed curvilinear geometric figure 112 to the sides 106 of the polygon 104 provides a visual cue as to the magnitude of the instantaneous hub moment. Specifically, since the sides 106 of the polygon 104 represent the hub moment limits, and since the cross hairs 114 represents zero hub moment, then it follows that proximity of the closed curvilinear geometric figure 112 to the sides 106 of the polygon 104 is indicative of greater hub moments, and proximity of the closed curvilinear geometric figure 112 to the cross hairs 114 is indicative of lesser hub moments.

In the described embodiment, additional visual cues are provided to apprise the pilot of the proximity of the instantaneous hub moment to the hub moment limits. Specifically, when the closed curvilinear geometric figure 112 is proximal to the sides 106 of the polygon 104, the closed curvilinear geometric figure 112 begins to flash. In addition, if the closed curvilinear geometric figure 112 crosses the threshold of any of the sides 106 of the polygon 104, the polygon 104 and the closed curvilinear geometric figure 112 flash until the closed curvilinear geometric figure 112 returns to the interior region 108 of the polygon 104.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. Taxi and slope landing symbology for a helicopter having a main rotor drive shaft and a main rotor hub defining a hub moment, the main rotor drive shaft and the main rotor hub having hub moment limits, the taxi and slope landing symbology comprising:

(a) a first symbol for providing a symbolic representation of the hub moment limits;
   (b) a second symbol for providing a dynamic symbolic representation of the instantaneous hub moment, and disposed in combination with said first symbol to provide a visual cue of the instantaneous hub moment relative to the hub moment limits; and
   (c) a third symbol for providing a symbolic representation of zero hub moment, and disposed in combination with said first symbol and said second symbol to provide a visual cue of the instantaneous hub moment relative to the hub moment limits and said zero hub moment.

2. The taxi and slope landing symbology of claim 1, wherein said first symbol comprises a polygon having sides representative of the instantaneous hub moment limits, and defining an interior region.

3. The taxi and slope landing symbology of claim 2, wherein said second symbol comprises a closed curvilinear geometric figure disposed within said interior region of said polygon and capable of movement relative to said sides of said polygon in response to changes in the hub moment, wherein the position of said closed curvilinear geometric figure relative to said sides of said polygon provides said visual cue of the instantaneous hub moment relative to the hub moment limits of the helicopter.

4. The taxi and slope landing symbology of claim 1, wherein said first symbol comprises a polygon having sides representative of the hub moment limits, and defining an interior region.

5. The taxi and slope landing symbology of claim 4, wherein said third symbol comprises cross hairs disposed within said interior region of said polygon in a static relationship relative to said sides of said polygon.

6. The taxi and slope landing symbology of claim 1,
   (a) wherein the helicopter further includes a landing assembly for supporting the helicopter relative to a surface; and
   (b) wherein the taxi and slope landing symbology further comprises a fourth symbol disposed in combination with said first symbol, for providing a symbolic representation of contact status between said landing assembly and the surface.

7. The taxi and slope landing symbology of claim 6, wherein:
   (a) said landing assembly comprises landing gear having a plurality of wheels; and
   (b) said fourth symbol comprises a plurality of closed curvilinear geometric figures, each of said closed curvilinear geometric figures corresponding to one of said plurality of wheels;
   (c) wherein each of said closed curvilinear geometric figures has a first configuration representative of said corresponding wheel not contacting the surface, and a second configuration representative of said corresponding wheel contacting the surface, wherein said first configuration and said second configuration provide, respectively, a visual cue as to which of said plurality of wheels are not in contact with the surface and which of said plurality of wheels are in contact with the surface.

8. Taxi and slope landing symbology for a helicopter having a video display subsystem, a main rotor drive shaft and a main rotor hub defining a hub moment, a hub moment sensor subsystem disposed in combination with the main rotor drive shaft for generating data representative of the instantaneous hub moment, a computer subsystem for processing the data representative of the instantaneous hub moment, the computer subsystem being programmed with hub moment limit data representative of hub moment limits for the helicopter, the computer subsystem also including a symbol generator for generating the taxi slope landing symbology in combination with the video display subsystem, the taxi and slope landing symbology comprising:

(a) a first symbol for providing a symbolic representation of the hub moment limits;
   (b) a second symbol for providing a dynamic symbolic representation of the instantaneous hub moment, and disposed in combination with said first symbol to provide a visual cue of the instantaneous hub moment relative to the hub moment limits; a
   (c) a third symbol for providing a symbolic representation of zero hub moment, and disposed in combination with said first symbol and said second symbol to provide a visual cue of the instantaneous hub moment relative to the hub moment limits and said zero hub moment.

9. The taxi and slope landing symbology of claim 8, wherein said first symbol comprises a polygon having sides representative of the hub moment limits, and defining an interior region.

10. The taxi and slope landing symbology of claim 9, wherein said second symbol comprises a closed curvilinear geometric figure disposed within said interior region of said polygon and capable of movement relative to said sides of said polygon in response to changes in the instantaneous hub moment, wherein the position of said closed curvilinear geometric figure relative to said sides of said polygon provides said visual cue of the instantaneous hub moment relative to the hub moment limits.

11. The taxi and slope landing symbology of claim 8, wherein said first symbol comprises a polygon having sides representative of the hub moment limits, and defining an interior region.

12. The taxi and slope landing symbology of claim 11, wherein said third symbol comprises cross hairs disposed within said interior region of said polygon in a static relationship relative to said sides of said polygon.

13. The taxi and slope landing symbology of claim 8,
   (a) wherein the helicopter further comprises a landing assembly for supporting the helicopter relative to a surface, a landing sensor subsystem disposed in combination with said landing assembly for generating data representative of contact status between said landing assembly and the surface, wherein the computer subsystem is operable to process said data representative of said contact status between said landing assembly and the surface; and
   (b) a fourth symbol disposed in combination with said first symbol, for providing a symbolic representation of said contact status between said landing assembly and the surface.

14. The taxi and slope landing symbology of claim 13, wherein:
  (a) said landing assembly comprises landing gear having a plurality of wheels; and
  (b) said fourth symbol comprises a plurality of closed curvilinear geometric figures, each of said closed curvilinear geometric figures corresponding to one of said plurality of wheels;
  (c) wherein each of said closed curvilinear geometric figures has a first configuration representative of said corresponding wheel not contacting the surface, and a second configuration representative of said corresponding wheel contacting the surface, wherein said first configuration and said second configuration provide, respectively, a visual cue as to which of said plurality of wheels are not in contact with the surface and which of said plurality of wheels are in contact with the surface.

15. Taxi and slope landing symbology display system for a helicopter having a main rotor drive shaft and a main rotor hub defining a hub moment, the taxi and slope landing symbology display system comprising:
  (a) a video display subsystem;
  (b) a hub moment sensor subsystem disposed in combination with the main rotor drive shaft for generating data representative of the instantaneous hub moment; and
  (c) a computer subsystem for processing said data representative of the instantaneous hub moment, said computer subsystem being programmed with hub moment limit data representative of hub moment limits for the helicopter, and including a symbol generator for generating taxi and slope landing symbology in combination with said video display subsystem, said taxi and slope landing symbology comprising
    first symbol for providing a symbolic representation of said hub moment limits,
    a second symbol for providing a dynamic symbolic representation of the instantaneous hub moment, and disposed in combination with said first symbol to provide a visual cue of the instantaneous hub moment relative to said hub moment limits, and
    a third symbol for providing a symbolic representation of zero hub moment, and disposed in combination with said first symbol and said second symbol to provide a visual cue of the instantaneous hub moment relative to said hub moment limits and said zero hub moment.

16. The taxi and slope landing symbology display system of claim 15,
  (a) wherein the helicopter further comprises a landing assembly for supporting the helicopter relative to a surface, a landing sensor subsystem disposed in combination with said landing assembly for generating data representative of contact status between said landing assembly and the surface, wherein said computer subsystem is operable to process said data representative of said contact status between said landing assembly and the surface; and
  (b) a fourth symbol disposed in combination with said first symbol, for providing a symbolic representation of said contact status between said landing assembly and the surface.

17. The taxi and slope landing symbology display system of claim 16, wherein:
  (a) said landing assembly comprises landing gear having a plurality of wheels; and
  (b) said fourth symbol comprises a plurality of closed curvilinear geometric figures, each of said closed curvilinear geometric figures corresponding to one of said plurality of wheels;
  (c) wherein each of said closed curvilinear geometric figures has a first configuration representative of said corresponding wheel not contacting the surface, and a second configuration representative of said corresponding wheel contacting the surface, wherein said first configuration and said second configuration provide, respectively, a visual cue as to which of said plurality of wheels are not in contact with the surface and which of said plurality of wheels are in contact with the surface.

* * * * *